United States Patent [19]

Meneghetti

[11] Patent Number: 5,595,359
[45] Date of Patent: Jan. 21, 1997

[54] LANDING GEAR AXLE STEERING

[75] Inventor: Michael J. Meneghetti, Renton, Wash.

[73] Assignee: The Boeing Company, Seattle, Wash.

[21] Appl. No.: 343,812

[22] Filed: Nov. 22, 1994

[51] Int. Cl.$^6$ .................................................. B64C 25/50
[52] U.S. Cl. ........................ 244/50; 244/103 R; 280/23.1
[58] Field of Search ........................... 244/100 R, 103 R,
244/102 R, 50; 280/95.1, 99, 100, 24.01,
23, 24, 426; 180/134, 144, 264, 267, 159,
163, 81.1, 81.5, 81.6

[56] References Cited

U.S. PATENT DOCUMENTS

| 2,538,388 | 1/1951 | Sievers . |
| 2,851,231 | 9/1958 | Westcott, Jr.s . |
| 2,919,084 | 12/1959 | Lovell .................................... 244/50 |
| 3,091,416 | 5/1963 | Knights et al. . |
| 3,099,460 | 7/1963 | Sheehan ................................. 180/23 |
| 3,904,153 | 9/1975 | Watts . |
| 4,186,814 | 2/1980 | Hart ...................................... 180/23 |
| 4,982,976 | 1/1991 | Kramer ................................. 280/426 |
| 5,242,131 | 9/1993 | Watts . |

Primary Examiner—Galen L. Barefoot
Attorney, Agent, or Firm—Conrad O. Gardner

[57] ABSTRACT

A steerable landing gear for an aircraft having a six wheel, three axle truck has a steerable axle on either the rear or both forward and rear axles of the truck. A set of wheels driven about a vertical shaft utilizes a single actuator and a walking beam.

The present invention relates to multi-wheel landing gear trucks or bogies for large aircraft and particularly to a method and apparatus for steering a set of wheels.

3 Claims, 1 Drawing Sheet

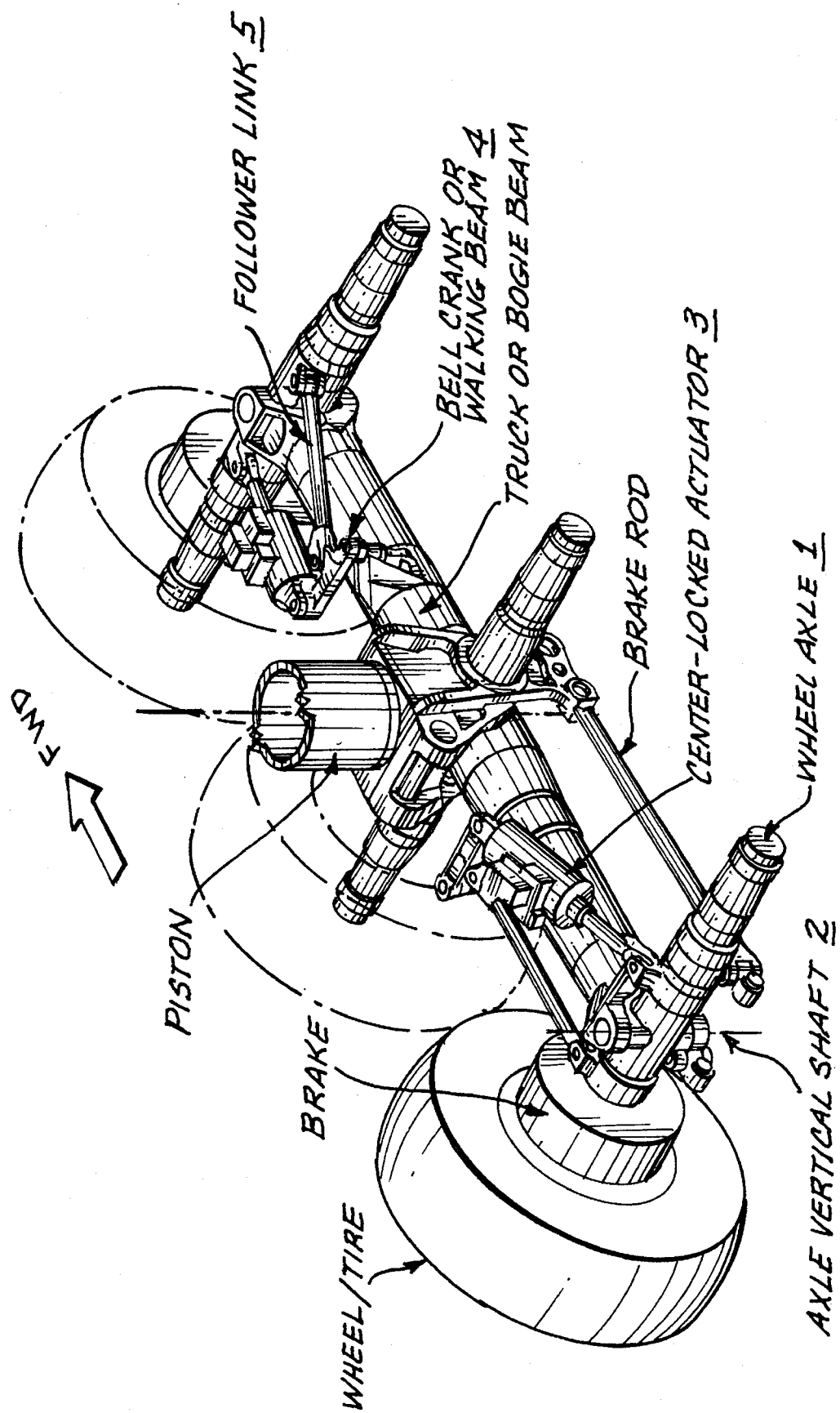

LANDING GEAR AXLE STEERING

BACKGROUND OF THE INVENTION

A typical six wheel truck assembly is shown in FIG. 1 of U.S. Pat. No. 5,242,131 to Watts issued Sep. 7, 1993 and also assigned to the Boeing Company the details of which are incorporated herein by reference. Watts, U.S. Pat. No. 5,242,131 titled "Steerable Landing Gear", is illustrative of reduced landing gear turning forces on an airplane with a six wheel, three axle truck. Tire scrubbing, and hence tire wear, is reduced by a steerable axle on either the rear, or both forward and rear positions on the truck. The axle is operated by two hydraulic actuators proportionally controlled by the nose gear steering system. In contrast the present improvement defines the rear axle actuation mechanism comprising a "walking beam" mechanism operated by a single, center-locked hydraulic actuator, positioned between the center and rear (or front) axles. A compact, minimum weight installation is achieved, which does not compromise airplane towing or jacking. Also, U.S. Pat. No. 5,242,131 shows that attachment of the hydraulic components aft of the axle vertical plane do not facilitate conventional towing and jacking attachments.

Further exemplary prior art includes U.S. Pat. No. 2,538,388 to Sievers and U.S. Pat. No. 3,091,416 to Knight et al. which are intended to position a main landing gear for cross-wind landing operations. U.S. Pat. No. 2,538,388 also has a steering function but requires an externally-driven torque shaft, internal to the shock strut, powering a spur gear on the underside of the truck beam. This gear engages with exposed gearing and link mechanisms to steer multiple wheel pairs. U.S. Pat. No. 2,851,231 to Wescott is limited to a tandem wheel configuration. The forward truck beam 17 is connected directly to the airplane by torque links 27. The rear truck beam 16 is integral to the shock absorber inner cylinder and is free to caster during steering maneuvers. It is aligned (for retraction) by an inner cylinder cam 44 engaging a centering cam 43, when the shock strut extends fully on takeoff. U.S. Pat. No. 3,904,153 to Watts also assigned to the Boeing Company defines an entire nose landing gear with mechanisms for gear actuation, locking and steering.

SUMMARY OF THE INVENTION

A steerable axle for a six wheel, three axle truck actuated by a walking beam mechanism, powered by a single hydraulic actuator locked at mid-stroke for takeoff and landing.

It is accordingly an object of the present invention to provide attachment of hydraulic components forward of the axle vertical plane to prevent undesirable induced dynamic response.

BRIEF DESCRIPTION OF THE DRAWINGS

The foregoing object and many of the attendant advantages of this invention will become more readily appreciated as the same becomes better understood by reference to the following detailed description when taken in conjunction with the accompanying drawing wherein: the Figure is illustrative of an isometric view of the left hand gear of a six wheel truck assembly having steerable forward and aft wheel axles.

DESCRIPTION OF THE PREFERRED EMBODIMENT

Turning now to the drawing in the Figure it will be seen that a set of wheels is driven about vertical shaft 2 using a single actuator 3 assisted by a walking beam arrangement. The traditional walking beam is comprised of bell crank 4 with an offset pivot centerline which drives attached follower link 5 such that the link translates and rotates about the pivot centerline. The geometry is such that the actuator provides the power to simultaneously drive wheel axle 1 about its vertical shaft 2 and the bell crank about its pivot centerline. Follower link 5 is attached between bell crank 4 and the wheel axle such that its reaction load provides an additive turning moment about vertical shaft 2 to the turning moment provided by the actuator. In addition to steering, the functional requirements of this mechanism include the necessity of locking wheel axle 1 when steering is not being used such as during landing and take-off of the aircraft. In U.S. Pat. No. 5,242,131 this function was provided by a separate, external, hydraulic plunger-lock mechanism. The present system replaces the plunger-lock mechanism with the steering actuator 3 itself having this function integrated therein. The concept of an internally locked actuator (locked at its center stoke in the present system) is not novel per se nor is the concept of a walking beam per se.

What is claimed is:

1. In combination in an aircraft:

a steerable axle for a six wheel three axel truck actuated by a walking beam mechanism powered by a single hydraulic actuator locked at mid-stroke for takeoff and landing of said aircraft.

2. In combination in an aircraft:

a six wheel three axle truck assembly having steerable forward and aft wheel axles, and including in combination therewith;

a walking beam; and, a center-locked steering actuator for steering a wheel axle;

said center-locked steering actuator disposed between the center and forward axles of said six wheel truck.

3. In combination in an aircraft:

a six wheel three axle truck assembly having steerable forward and aft wheel axles; and including in combination therewith;

a walking beam; and, a center locked steering actuator for steering a wheel axle;

said center locked steering actuator disposed between the center and aft axles of said six wheel truck.

\* \* \* \* \*